United States Patent
Xia et al.

(10) Patent No.: US 12,308,422 B2
(45) Date of Patent: May 20, 2025

(54) LITHIUM NICKEL-MANGANESE-COBALT OXIDE CATHODE POWDERS FOR HIGH VOLTAGE LITHIUM-ION BATTERIES

(71) Applicants: Umicore, Brussels (BE); Umicore Korea Ltd., Chungnam (KR)

(72) Inventors: Xin Xia, Cheonan (KR); Jens Paulsen, Daejeon (KR); JiHye Kim, Cheonan (KR); Song-Yi Han, Daejeon (KR)

(73) Assignees: UMICORE, Brussels (BE); UMICORE KOREA LTD., Chungnam (KR)

(*) Notice: Subject to any disclaimer, the term of this patent is extended or adjusted under 35 U.S.C. 154(b) by 75 days.

(21) Appl. No.: 17/232,348

(22) Filed: Apr. 16, 2021

(65) Prior Publication Data

US 2021/0399287 A1    Dec. 23, 2021

Related U.S. Application Data

(62) Division of application No. 15/544,962, filed as application No. PCT/IB2016/050257 on Jan. 20, 2016, now Pat. No. 11,011,747.

(30) Foreign Application Priority Data

Jan. 23, 2015 (EP) ................... 15152289

(51) Int. Cl.
*H01M 4/36* (2006.01)
*C01G 53/52* (2025.01)
(Continued)

(52) U.S. Cl.
CPC ............ *H01M 4/366* (2013.01); *C01G 53/52* (2013.01); *C01G 53/66* (2013.01);
(Continued)

(58) Field of Classification Search
CPC .... H01M 4/02; H01M 4/13–139; H01M 4/48; H01M 4/483–525; H01M 10/05–0525; C01G 53/40–66
See application file for complete search history.

(56) References Cited

U.S. PATENT DOCUMENTS 6,218,048 B1    4/2001 Manev
8,852,452 B2   10/2014 Paulsen
(Continued)

FOREIGN PATENT DOCUMENTS

CN    104247102 A    12/2014
JP    2002164053 A    6/2002
(Continued)

OTHER PUBLICATIONS

EPO; European Search Report for European Patent Application No. EP15152289, dated Jul. 20, 2015, 1 page.
(Continued)

*Primary Examiner* — Jonathan Crepeau
*Assistant Examiner* — Jacob Buchanan
(74) *Attorney, Agent, or Firm* — NK Patent Law

(57) ABSTRACT

A lithium metal oxide powder for a cathode material in a rechargeable battery comprises a core and a surface layer. The surface layer is delimited by an outer and an inner interface. The inner interface is in contact with the core. The cathode material has a layered crystal structure comprising the elements Li, M, and oxygen. M has the formula $M=(Ni_z(Ni_{1/2}Mn_{1/2})_y Co_x)_{1-k} A_k$, with $0.15 \leq x \leq 0.30$, $0.20 \leq z \leq 0.55$, $x+y+z=1$ and $0<k\leq 0.1$. The Li content is stoichiometrically controlled with a molar ratio $0.95 \leq Li:M \leq 1.10$. A is at least one dopant and comprises Al. The core at the inner interface has an Al content of 0.3-3 mol %. The surface layer comprises an intimate mixture of Ni, Co, Mn, LiF and $Al_2O_3$ determined by XPS. The surface layer has a Mn content that
(Continued)

decreases from the Mn content at the inner interface to less than 50% of the Mn content at the outer interface.

16 Claims, 8 Drawing Sheets

(51) Int. Cl.
C01G 53/66 (2025.01)
H01M 4/04 (2006.01)
H01M 4/131 (2010.01)
H01M 4/485 (2010.01)
H01M 4/505 (2010.01)
H01M 4/525 (2010.01)
H01M 4/62 (2006.01)
H01M 10/0525 (2010.01)

(52) U.S. Cl.
CPC ......... *H01M 4/0471* (2013.01); *H01M 4/131* (2013.01); *H01M 4/485* (2013.01); *H01M 4/505* (2013.01); *H01M 4/525* (2013.01); *H01M 4/62* (2013.01); *H01M 10/0525* (2013.01); *C01P 2006/40* (2013.01); *H01M 2220/20* (2013.01); *H01M 2220/30* (2013.01); *Y02T 10/70* (2013.01)

(56) References Cited

U.S. PATENT DOCUMENTS

| | | |
|---|---|---|
| 2004/0091779 A1 | 5/2004 | Kang |
| 2005/0079416 A1* | 4/2005 | Ohzuku ............... H01M 4/485 423/594.2 |
| 2006/0233696 A1* | 10/2006 | Paulsen ................ C01G 51/50 423/594.6 |
| 2007/0178370 A1 | 8/2007 | Amine |
| 2007/0292761 A1 | 12/2007 | Park |
| 2009/0087362 A1 | 4/2009 | Sun |
| 2012/0034516 A1 | 2/2012 | Koo |
| 2012/0261610 A1 | 10/2012 | Paulsen |
| 2013/0122370 A1 | 5/2013 | Rho |
| 2013/0175469 A1 | 7/2013 | Paulsen |
| 2013/0260210 A1 | 10/2013 | Takami |
| 2014/0054495 A1 | 2/2014 | Paulsen |
| 2015/0104704 A1 | 4/2015 | Kim |
| 2015/0147655 A1 | 5/2015 | Park |
| 2015/0162598 A1 | 6/2015 | Kim |
| 2016/0036041 A1* | 2/2016 | Uwai ..................... C01G 53/50 429/231.1 |

FOREIGN PATENT DOCUMENTS

| | | | |
|---|---|---|---|
| JP | 2013510393 A | 3/2013 | |
| JP | 2013105749 A | 5/2013 | |
| WO | 2011054441 | 5/2011 | |
| WO | 20120107313 | 8/2012 | |
| WO | 2012176901 A1 | 12/2012 | |
| WO | 2014073833 A1 | 5/2014 | |
| WO | 2014119275 A1 | 8/2014 | |
| WO | WO-2014142279 A1 * | 9/2014 | ............ C01G 53/50 |

OTHER PUBLICATIONS

ISA/KR; International Search Report and Written Opinion for International Patent Application No. PCT/IB2016/050257, dated May 12, 2016, 8 pages.
Burns, J.C. et al., "Predicting and Extending the Lifetime of Li-Ion Batteries", Journal of the Electrochemical Society, (2013), vol. 160, No. 9, 6 pages.
USPTO; Non-Final Office Action for U.S. Appl. No. 15/544,962 dated Apr. 28, 2020, 14 pages.
USPTO; Non-Final Office Action for U.S. Appl. No. 15/544,962 dated Apr. 10, 2019, 12 pages.
USPTO; Final Office Action for U.S. Appl. No. 15/544,962 dated Oct. 4, 2019, 16 pages.
WIPO; International Preliminary Report on Patentability for International Patent Application No. PCT/IB2016/050257 dated Jan. 13, 2017, 19 pages.

* cited by examiner

LITHIUM NICKEL-MANGANESE-COBALT OXIDE CATHODE POWDERS FOR HIGH VOLTAGE LITHIUM-ION BATTERIES

CROSS-REFERENCE TO RELATED APPLICATIONS

This application is a Divisional application of U.S. application Ser. No. 15/544,962, filed Jul. 20, 2017, which is a National Stage application of International Application No. PCT/IB2016/050257, filed Jan. 20, 2016, and which also claims priority under 35 U.S.C. § 119 to European Application No. 15152289.3, filed Jan. 23, 2015.

TECHNICAL FIELD AND BACKGROUND

This invention relates to improved cathode materials for rechargeable lithium-ion batteries. The cathode material contains Ni, Mn and Co, is surface treated and has a modified composition which shows improved cycle stability during long term cycling in full cells, especially at high charge cut-off voltage (>4.35V), at both room and elevated temperatures.

Commercially available lithium-ion batteries typically contain a graphite-based anode and cathode materials. A cathode material is usually a powderous material capable to reversibly intercalate and de-intercalate lithium. Historically $LiCoO_2$ was the dominating cathode material for rechargeable lithium batteries. Recently the so-called NMC cathode materials replace $LiCoO_2$ in many applications. "NMC" is an abbreviation for nickel-manganese-cobalt, and it is used for lithium transition metal based oxides, where the transition metal is a mixture of basically Ni, Mn and Co, having roughly the stoichiometry $LiMO_2$, where $M=Ni_xMn_yCo_z$. Additional doping is possible, and typical doping elements are Al, Mg, Zr etc. The crystal structure is an ordered rocksalt structure, where the cations order into 2-dimensional Li and M layers. The space group is R-3M. There are many different compositions possible, often categorized and named after their nickel, manganese and cobalt content. Typical NMC based materials are "111" with $M=Ni_{1/3}Mn_{1/3}Co_{1/3}$, "442" with $M=Ni_{0.4}Mn_{0.4}Co_{0.2}$, "532" with $M=Ni_{0.5}Mn_{0.3}Co_{0.2}$, "622" with $M=Ni_{0.6}Mn_{0.2}Co_{0.2}$ etc. It is known that the gravimetric energy density of NMC is increasing with Ni content for a constant Li potential, for example, NMC622 has a higher gravimetric energy density than NMC532 and NMC111, when charged to the same voltage.

Due to their high energy density, rechargeable lithium and lithium-ion batteries can be used for a variety of purposes. One of the most important applications is in portable electronic applications, such as cellular phones, laptop computers, digital and video cameras. Another other very important application is automotive, including BEV (battery electric vehicles), HEV (hybrid electric vehicles) and PHEV (plug-in hybrid electric vehicles).

Regarding portable applications, NMC is not competitive with $LiCoO_2$ into the high end portable devices, for example in polymer cells for smartphones, while successfully replacing $LiCoO_2$ in low end portable devices, for example cylinder cells for laptop batteries. A major reason for this is that the volumetric energy density of commercially successful NMC products, which are mainly NMC111 and NMC532, is lower compared to $LiCoO_2$, when charged to the normal applicable voltage (4.2V) in polymer cells. There are some advanced high voltage $LiCoO_2$ products commercially available in the market, which can give a decent cycle stability in full cells, when cycled up to 4.35 V or even 4.4V. In order to make NMC competitive with $LiCoO_2$ concerning high energy density, a higher application voltage has to be used, for example, 4.35V or 4.4V, and NMC compositions should switch to higher Ni content, for example, from NMC111 to NMC622. Therefore, so-called "high Ni" NMC (with a Ni content of at least 45 mol %) cathodes that can be cycled stably at a high voltage are needed for portable applications.

Regarding automotive applications, NMC is currently dominating the market, due to its lower cost compared to $LiCoO_2$. The requirements for batteries for automotive applications are stricter than those for portable electronics. A very long cycle life is mandatory, usually 80% capacity of the batteries should remain after 2000 cycles (at a 4.2V charge), using a full charge and discharge cycle. The high temperature cycle stability should be good, because batteries in the automotive usually work at an elevated temperature. There are also very strict requirements for the other properties of the batteries, for example, calendar life, safety, etc. Similar to batteries for portable application, improving the energy density of the cathode is primordial in the automotive applications. Effective approaches may be: using NMC materials with a high Ni content, for example NMC622, and increasing the charge cut-off voltage from currently 4.2V to 4.35V or even 4.4V.

However, there are several issues if one wants to use high Ni NMC at high voltage. First, high Ni NMC usually has serious issues of soluble base content. The soluble base content refers to the presence of surface impurities like $Li_2CO_3$ and LiOH. $Li_2CO_3$ and LiOH could either come from unreacted reagents of lithium sources, which are usually $Li_2CO_3$ or LiOH, or from ion exchange reactions with Li present in solvents, which can form LiOH and protons. The soluble base content is usually measured by a technique called pH titration, as is explained in WO2012/107313. The soluble bases will eventually cause a serious gas generation in full cells, which is usually called "bulging" in full cell tests. Serious gas generation/bulging issues will result in bad cycling life of battery, and safety concerns. In WO2011/054441, the authors propose a special LiF coating layer on NMC cathode materials, which can significantly reduce the soluble base content and suppress the gas generation of NMC polymer cells.

Another issue is that it is difficult to achieve a good cycle stability when NMC is charged to high voltages, for example 4.35V or even 4.4V. The reasons for this failure mechanism of NMC/graphite polymer cells when operated at high charge cut-off voltage is still unclear. It is known, e.g. from U.S. Pat. No. 6,218,048, that one of the main drawbacks of 4V or higher secondary lithium and lithium-ion batteries is electrolyte decomposition during the charging process or during the shelf life of the battery in its charged state. The negative effects of this decomposition are considerably accelerated at elevated temperatures. Accordingly, to decrease electrolyte decomposition in conventional cells, low voltage limits are applied strictly during the cell charge process. When manganese-rich and cobalt-rich lithiated metal oxides are used as positive electrode materials, manganese and cobalt dissolution can occur in the cell. This dissolution is observed in the electrolyte and results in a reduction in the capacity and cycleability of the cell. In particular, the negative effect of manganese dissolution is more pronounced because it is believed that the dissolved manganese catalyzes electrolyte polymerization and/or decomposition. It is in general needed to limit the dissolution of any transition metal in the positive electrode into the electrolyte of the battery.

In J. Electrochem. Soc. 2013 160(9): A1451-A1456, Dahn et al. speculate that the polymer cells using NMC fails due to indissoluble electrolyte oxidized products created near the cathode surface, and moving to the anode side to block the SEI (solid-electrolyte interface), and then eventually blocking the diffusion path of Li$^+$. Dahn also proposes that an effective surface coating on the cathode or effective functional electrolyte additives could suppress the electrolyte oxidization and extend the cycle life of the batteries. In US2009/0087362, the authors provide a LiCoO$_2$ powder which is covered by an AlF$_3$ layer. This coated LiCoO$_2$ shows improved cycle stability in a LiCoO$_2$/Li half cell when charged to 4.5 V, at both 25° C. and 55° C.

In view of the problems cited before, in order to use high Ni NMC materials in high voltage applications, an effective surface modification is needed. An object of the present invention is to provide NMC cathode materials with high Ni content that are showing the improved properties required for high end portable and automotive applications.

SUMMARY

Viewed from a first aspect, the invention can provide a lithium metal oxide powder for a cathode material in a rechargeable battery, comprising a core and a surface layer, the surface layer being delimited by an outer and an inner interface, the inner interface being in contact with the core, the core having a layered crystal structure comprising the elements Li, M and oxygen, wherein M has the formula M=(Ni$_z$ (N$_{1/2}$ Mn$_{1/2}$)$_y$ Co$_x$)$_{i-k}$ A$_k$, with 0.15≤x≤0.30, 0.10≤z≤0.55, x+y+z=1 and 0<k≤0.1, wherein the Li content is stoichiometrically controlled with a molar ratio 0.95≤Li:M≤1.10; wherein A is at least one dopant and comprises Al, wherein the core has an Al content of 0.3-3 mol % and a F content of less than 0.05 mol %; wherein the surface layer comprises an intimate mixture of Ni, Co, Mn, LiF and Al$_2$O$_3$; and wherein the surface layer has an Al content that increases from the Al content of the core at the inner interface to at least 10 mol % at the outer interface, and a F content that increases from less than 0.05 mol % at the inner interface to at least 3 mol % at the outer interface, the Al and F contents being determined by XPS. In one embodiment the Al content in the core is 0.5-2.5 mol %, as determined by XPS. In another embodiment the powder consists of the core and surface layer described above.

The invention may also provide a lithium metal oxide powder for a cathode material in a rechargeable battery, comprising of a core and a surface layer, the surface layer being delimited by an outer and an inner interface, the inner interface being in contact with the core, the core having a layered crystal structure comprising the elements Li, M and oxygen, wherein M has the formula M=(Ni$_z$ (N$_{1/2}$ Mn$_{1/2}$)$_y$ Co$_x$)$_{i-k}$ A$_k$, with 0.15≤x≤0.30, 0.10≤z≤0.55, x+y+z=1 and 0<k≤0.1, wherein the Li content is stoichiometrically controlled with a molar ratio 0.95≤Li:M≤1.10; wherein A is at least one dopant and comprises Al, wherein the core has an Al content of 0.3-3 mol %; wherein the surface layer comprises an intimate mixture of Ni, Co, Mn, LiF and Al$_2$O$_3$; and wherein the surface layer has a Mn content that decreases from the Mn content of the core at the inner interface, to less than 50%, and preferably less than 45%, of the Mn content of the core at the outer interface, the Al content in the core and the Mn content being determined by XPS. In one embodiment the surface layer further has a Ni content that decreases from the Ni content of the core at the inner interface, to less than 25%, and preferably less than 20% of the Ni content of the core at the outer interface, as determined by XPS. In another embodiment, the surface layer further has a Co content that decreases from the Co content of the core at the inner interface, to less than 35%, and preferably less than 25% of the Co content of the core at the outer interface, as determined by XPS. It is well understood that the contents of Mn, Co and Ni have a constant value in the core of the material. The invention can also provide a lithium metal oxide powder that has both the features of the Al and the F gradient, and also the Mn gradient described before. In another embodiment the powder consists of the core and surface layer described above.

The composition of the core, i.e. the indices x, y, z and k are determined by the stoichiometry of the elements constituting M as supplied in the precursors of these elements, and can be checked by known analysis methods, such as ICP. In the previous embodiments the Al content in M is preferably between 0.5 and 2 mol %, corresponding to 0.005≤k≤0.02, the lower limit being the guarantee that the desired product advantages are obtained, the upper limit indicating that a surplus of Al is not really needed to achieve the advantages. In another embodiment, A=Al and Ca, with 0.005≤k≤0.02. In the different product embodiments, the F content is preferably equal to 0 mol % in the core of the oxide powder. In the various embodiments also, the thickness of the surface layer may be more than 50 nm and less than 400 nm. The thickness of this surface layer is more than 50 nm, preferably more than 150 nm; and less than 400 nm, preferably less than 200 nm. It is clear that the outer interface of the surface layer corresponds to the actual surface of the particle. The inner interface may also be defined as the depth established with XPS where the Al content is at least 0.05 mol % higher than the constant doping level in the core of the material, also measured with XPS. If the surface layer thickness is less than 50 nm, it may be that the layer does not effectively reduce the content of the soluble bases and limit the dissolution of Mn in the electrolyte. If the layer is thicker than 400 nm, it may be that the intercalation and de-intercalation of Li is hindered too much, and the specific capacity of the powder is then lowered.

The thickness of the surface layer is determined by XPS measurement. A sputtering rate in SiO$_2$: 6.0 nm/minute is applied to calculate the depth/thickness. The thickness here is obtained by the sputtering time multiplied by the (reference) sputtering rate in SiO$_2$. During the XPS measurement, it is difficult to obtain the sputtering rate of measured objectives. A typical way is to normalize the thickness by using a standard sputtering rate (in SiO$_2$ here) for all samples. Therefore, it is not necessary true that the thickness calculated here is the same as could be obtained by other spectra methods, for example, Scanning Electron Microscopy (SEM). However, for descriptions of the properties of the coating layer, such as element distribution with different layer thickness, XPS can provide accurate qualitative and quantitative data.

In an embodiment of the product of the invention described before, the surface layer consists of an intimate mixture of elements of the core, LiF and Al$_2$O$_3$, and further contains either one or more compounds from the group consisting of CaO, TiO$_2$, MgO, WO$_3$, ZrO$_2$, Cr$_2$O$_3$ and V$_2$O$_5$. In a particular embodiment the surface layer consists of an intimate mixture of elements of the core, LiF and either nanometric crystalline Al$_2$O$_3$, or nanometric crystalline Al$_2$O$_3$ and sub-micrometric CaO.

In an embodiment, the F content of the core may be equal to 0 mol %. In different embodiments of the present invention, the lithium metal oxide powder has one or more of the following characteristics:
a) $0.20 \leq z \leq 0.55$.
b) $0.15 \leq x \leq 0.20$, $0.40 \leq z \leq 0.55$ and $1 \leq Li:M \leq 1.10$.
c) A=Al or A=Al and Ca, and $0.005 \leq k \leq 0.02$.
d) A=Al or A=Al and Ca, $k=0.01\pm0.005$, $x=0.20\pm0.02$, $y=0.40\pm0.05$, $z=0.40\pm0.05$ and $1 \leq Li:M \leq 1.10$.

It is clear that further product embodiments according to the invention may be provided by combining features that are covered by the different product embodiments described before.

Viewed from a second aspect, the invention can provide a method for making the lithium metal oxide powder according to the invention, comprising the steps of:
providing a first mixture comprising a lithium M'-oxide powder, with $M'=Ni_z (N_{1/2} Mn_{1/2})_y Co_x$, $0.15 \leq x \leq 0.30$, $0.10 \leq z \leq 0.55$ and $x+y+z=1$, and a first source of A comprising Al,
heating the first mixture to a first sintering temperature of at least 500° C.,
sintering the first mixture at the first sintering temperature for a first period of time,
cooling the first sintered mixture, preferably down to room temperature,
adding a fluorine-containing polymer and a second source of A comprising Al to the mixture of the sintered mixture, thereby obtaining a second mixture,
heating the second mixture to a second sintering temperature between 250 and 500° C., and
sintering the second mixture at the second sintering temperature for a second period of time, thereby obtaining the lithium metal oxide powder, and cooling the powder. In one embodiment $0.20 \leq z \leq 0.55$. In different embodiments, the first sintering temperature is between 650 and 750° C., and the second sintering temperature is between 350 and 400° C. These temperature ranges proved to be effective for achieving the desired product properties. In one embodiment, both the first period of time of the first sintering step and the second period of time of the second sintering step are between 5 and 10 hr. In another embodiment, either one or both of the first and the second source of A is $Al_2O_3$. There may also be added CaO to A. In this embodiment either one or both of the first and the second source of A may further comprise either one or more compounds selected from the group consisting of CaO, $TiO_2$, MgO, $WO_3$, $ZrO_2$, $Cr_2O_3$ and $V_2O_5$. In another embodiment the source of A comprises a nanometric alumina powder having a D50<100 nm and a BET≥50 m²/g. This source may also comprise a sub-micrometric CaO powder having a D50<200 nm and a BET≥30 m²/g. During the second sintering step, the crystalline structure of the alumina that is added is preserved in the final product, which is advantageous for obtaining the desired product properties. In still another embodiment, the amount of fluorine-containing polymer in the second mixture is between 0.1 and 2 wt %, and preferably between 0.2 and 0.5 wt %. In different embodiments, the fluorine-containing polymer is a PVDF homopolymer, or a PVDF copolymer, or a PVDF-HFP (hexafluoro propylene) polymer, or a PTFE (polytetrafluoroethylene) polymer. It is clear that further method embodiments according to the invention may be provided by combining features that are covered by the different method embodiments described before.

Viewed from a third aspect, the invention can provide an electrochemical cell (such as a Li-ion battery) comprising a cathode material comprising the lithium metal oxide powder according to the invention, wherein the electrochemical cell is used in a portable electronic device, such as a portable computer, a tablet, a mobile phone, and in an electrically powered vehicle or an energy storage system.

DETAILED DESCRIPTION

Figure 1:
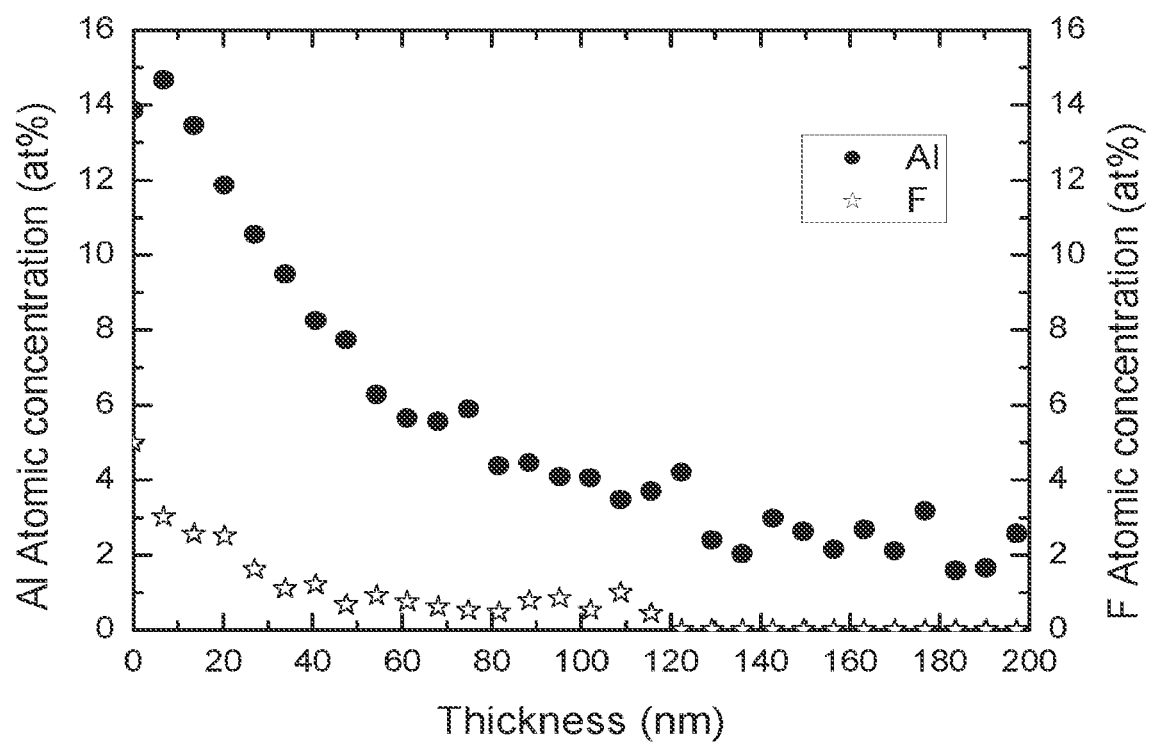
FIG. 1: Al and F atomic concentration vs thickness measured by XPS for Example 1

The invention provides cathode material powders which have an improved cycle stability when charged up to 4.35V and/or 4.4V in full cells, at both room and elevated temperature. These materials have a high Ni content (i.e. at least 45 mol % and at most 70 mol % of the transition metal content) which can provide a significantly higher energy density compared to existing commercial NMC cathode materials, for example NMC111. The powders could even be competitive with commercial $LiCoO_2$ when considering the energy density. Therefore, the cathode materials according to the invention are promising candidates for a use in high end portable electronics and automotive applications.

The authors discovered that NMC cathode powders with surface layers that have either both an Al and a fluor gradient in the surface layer, or a manganese gradient in the surface layer have superior characteristics when used in Li-ion batteries. The existence of an Al gradient and a Mn gradient in the surface layer may help to improve the cycle stability when the cathode materials are charged to high voltage (4.35V or 4.4V). The F gradient in the coating layer on the other hand may help to reduce the amount of soluble base and eventually improve the bulging properties of a full cell.

In accordance with the invention, the particles forming the powder of the invention have a core and a surface layer that may be a coating layer. The surface layer is delimited by an outer and an inner interface, the inner interface being in contact with the core. The core may have an Al content more than 0.3 mol % but less than 3.0 mol %, and a F content less than 0.05 mol %, as determined by XPS.

In the first embodiment, the surface layer has an Al content that increases continuously from the Al content of the core at the inner interface to more than 10 mol % at the outer interface, and preferably more than 12 mol %; and has a F content that increases continuously from less than 0.05 mol % at the inner interface to at least 3 mol % at the outer interface, preferably at least 5 mol % at the outer interface. The concentration of the different elements in the surface layer—being at least Ni, Co, Mn, LiF and —$Al_2O_3$— and the outer part of the core can be determined using X-ray photoelectron spectroscopy (XPS).

In a different embodiment, the surface layer has a Mn content that decreases continuously from the Mn content of the core at the inner interface to less than 50% of the Mn content of the core at the outer interface, preferably less than 45% of the Mn content of the core at the outer interface. By limiting the Mn content in the surface layer, the dissolution of manganese may be effectively limited. It should be noted that in US2013/0122370 there is provided a cathode active material for lithium secondary battery containing the compound $Li_aNi_xCo_yM'_zMn_{(1-x-y-z)}O_2$ which is further doped or coated with phosphate fluoride, wherein M' is selected from the group consisting of Ca, Mg, Al, Ti, Mn, Fe, Co, Ni, Cu, Zn, Y, Zr, Nb, B, and a combination thereof; and $0.4<a\leq1.3$, $0\leq x\leq0.8$, $0\leq y\leq0.33$, $0\leq z\leq0.33$, and $0\leq x+y+z\leq1$.

The invention may further provide a cathode active material comprising: a composite oxide particle containing at least lithium Li, Ni, Mn and cobalt Co; and a surface layer which is provided on at least a part of the composite oxide particle and has a compound containing Li and an element of at least one of aluminum Al, manganese Mn, and fluor F, wherein a ratio [Al(T)Ni(S)/Al(S)Ni(T)] of an atomic ratio [Al(T)/Ni(T)] of Al to Ni as an average of the whole cathode active material to an atomic ratio [Al(S)/Ni(S)] of Al to Ni in the surface layer of the cathode active material is larger than a ratio [F(T)Ni(S)/F(S)Ni(T)] of an atomic ratio [F(T)/Ni(T)] of F to Ni as an average of the whole cathode active material to an atomic ratio [F(S)/Ni(S)] of F to Ni in the surface layer of the cathode active material. The invention may also provide a cathode active material comprising: a composite oxide particle containing at least lithium Li, Ni, Mn and cobalt Co; and a surface layer which is provided on at least a part of the composite oxide particle and has a compound containing lithium Li and an element of at least one of aluminum Al, manganese Mn, and fluor F, wherein a ratio [Mn(T)Ni(S)/Mn(S)Ni(T)] of an atomic ratio [Mn(T)/Ni(T)] of Mn to Ni as an average of the whole cathode active material to an atomic ratio [Mn(S)/Ni(S)] of Mn to Ni in a surface layer of the cathode active material is smaller than a ratio [Al(T)/Ni(S)/Al(S)Ni(T)] of an atomic ratio [Al(T)/Ni(T)] of Al to Ni as an average of the whole cathode active material to an atomic ratio [Al(S)/Ni(S)] of Al to Ni in the surface layer of the cathode active material. The Al, Mn, Ni and F contents may be determined by XPS.

The invention also provides a process as described in the summary. The first mixture is obtained by blending a lithium transition metal oxide core powder and a first source of A that comprises Al. For preparing this core powder, known methods are used. For example, lithium carbonate and a mixed Ni—Mn—Co oxy-hydroxide are homogeneously blended with a vertical single-shaft mixer by a dry powder mixing process. The blend ratio may be targeted to obtain the composition of the oxide powder without A and F. This dry powder mixture is sintered in a tunnel furnace in an oxidizing atmosphere. The sintering temperature is >850° C. and the dwell time is ~10 hrs. Dry air is used as an oxidizing gas. The process used for preparing the core powder yields particles that have a homogeneous composition, resulting in a constant Ni, Mn and Co content in the core.

In a preferred embodiment of the inventive method, A is least one dopant and comprises Al. A can be, besides Al, one or more elements from the group of Ca, Mg, Zr, W, Ti, Cr and V. A dopant, also called a doping agent, is a trace impurity element that is inserted into a substance (in very low concentrations) in order to alter the electrical properties or the optical properties of the substance. The source of A is preferably a compound selected from the group consisting of a metal oxide, for example—besides $Al_2O_3$—CaO, $TiO_2$, MgO, $WO_3$, $ZrO_2$, $Cr_2O_3$, $V_2O_5$ and mixtures thereof, more particularly a mixture of $Al_2O_3$ and CaO. The examples show that the combination of $Al_2O_3$ and CaO is particularly efficient. The preferred source of Al is a nanometric alumina powder, for example fumed alumina. The alumina can be obtained by precipitation, spray drying, milling, etc.

In one embodiment the alumina typically has a BET of at least 50 $m^2/g$ and consists of primary particles having a D50<100 nm, the primary particles being non-aggregated. In another embodiment fumed alumina or surface treated fumed alumina is used. Fumed alumina nanoparticles are produced in high temperature hydrogen-air flames and are used in several applications that involve products of everyday use. The preferred source of Ca is a sub-micrometric calcium oxide powder.

In one embodiment the CaO typically has a BET of at least 30 $m^2/g$ and consists of primary particles having a D50<200 nm, the primary particles being non-aggregated.

In accordance with the invention and process described in the summary, in the first heating step, the first mixture is heated to a temperature (referred to as first sintering temperature) which is at least 500° C., preferably at least 600° C., and more preferably at least 650° C. Preferably, the first sintering temperature is at most 800° C., more preferably at most 750° C., most preferably at most 700° C. The selection of this sintering temperature is important to obtain the doping of the lithium metal oxide core by element A. The first sintering time is the period of heat treatment at the constant sintering temperature. The sintering time is preferably at least 3 hours, more preferably at least 5 hours. Preferably, the sintering time is less than 15 hours, more preferably less than 10 hours.

After the first sintering step, the obtained powder is mixed with a source of F being a fluorine-containing polymer. A typical example for such a polymer is a PVDF homopolymer or PVDF copolymer (such as HYLAR® or SOLEF® PVDF, both from Solvay SA, Belgium). Another known PVDF based copolymer is for example a PVDF-HFP (hexa-fluoro propylene). Such polymers are often known under the name "Kynar®". Teflon—or PTFE—could also be used as polymer. The source of A in the second step can be the same as for the first step: a compound selected from the group consisting of a metal oxide, for example—besides $Al_2O_3$—$TiO_2$, MgO, $WO_3$, $ZrO_2$, $Cr_2O_3$, $V_2O_5$ and mixtures thereof. The preferred source of Al is a nanometric alumina powder, for example fumed alumina.

For the second sintering step, the second sintering temperature of the mixture is at least 250° C., preferably at least 350° C. Also, the second sintering temperature is preferably at most 500° C., more preferably less than 400° C. The selection of this sintering temperature is important to obtain a surface layer that actually is a coating comprising the dopant A (at least Al) and fluor. The second sintering time is preferably at least 3 hours, more preferably at least 5 hours. Preferably, the sintering time is less than 15 hours, more preferably less than 10 hours.

In the second sintering step, due to the lower sintering temperature, the crystalline structure of the fumed alumina is maintained during the coating process and is found in the coating layer surrounding the lithium metal oxide core. Also in the second sintering step, the fluorine-containing polymer—which is free of Li—starts to decompose in contact with the core material, as is described in WO2011/054441. The polymer is completely decomposed and lithium fluoride is formed, which is found in the surface layer of the particles. The LiF originates from the reaction of the decomposing polymer with lithium containing surface base of the lithium transition metal oxides. Whereas a normal fluoride containing polymer just melts upon heating, it can be established that the contact with the Li (soluble) base on the surface of the transition metal oxide initiates a chemical reaction leading to the decomposition of the polymer. It can be speculated that the LiF film protects the Li in the particle, thus preventing it from reacting with carbon to form $Li_2CO_3$. The obtained surface layer has the following function: the thin layer comprising LiF replaces the reactive surface base layer, thus reducing the base content practically to zero at the core's surface, and improves the overall safety.

The invention will now be illustrated in the following Examples:

Experimental Tests Used in the Examples a) Full Cell Making
a.1) Slurry Making and Coating A slurry is prepared by mixing 700 g of NMC cathode material with NMP, 47.19 g of super P® (conductive carbon black of Timcal) and 393.26 g of 10 wt % PVDF based binder in NMP solution. The mixture is mixed for 2.5 hrs in a planetary mixer. During mixing additional NMP is added. The mixture is transferred to a Disper mixer and mixed for 1.5 hrs under further NMP addition. A typical total amount of NMP used is 423.57 g. The final solid content in the slurry is about 65 wt %. The slurry is transferred to a coating line. Double coated electrodes are prepared. The electrode surface is smooth. The electrode loading is 9.6 mg/cm². The electrodes are compacted by a roll press to achieve an electrode density of about 3.2 g/cm³. The electrodes are used to prepare pouch cell type full cells as described hereafter.

a.2) Full Cell Assembly

For full cell testing purposes, the prepared positive electrodes (cathode) are assembled with a negative electrode (anode) which is typically a graphite type carbon, and a porous electrically insulating membrane (separator). The full cell is prepared by the following major steps: (a) electrode slitting, (b) electrode drying, (c) jellyroll winding, and (d) packaging.

(a) electrode slitting: after NMP coating the electrode active material might be slit by a slitting machine. The width and length of the electrode are determined according to the battery application.

(b) attaching the taps: there are two kinds of taps. Aluminum taps are attached to the positive electrode (cathode), and copper taps are attached to the negative electrode (anode).

(c) electrode drying: the prepared positive electrode (cathode) and negative electrode (anode) are dried at 85° C. to 120° C. for 8 hrs in a vacuum oven.

(d) jellyroll winding: after drying the electrode a jellyroll is made using a winding machine. A jellyroll consists of at least a negative electrode (anode) a porous electrically insulating membrane (separator) and a positive electrode (cathode).

(e) packaging: the prepared jellyroll is incorporated in a 650 mAh cell with an aluminum laminate film package, resulting in a pouch cell. Further, the jellyroll is impregnated with the electrolyte. The electrolyte used is a commercial product from *Panax* Etec Ltd. The composition is 1 M $LiPF_6$ in EC:DEC:EMC (1:1:1, m/m/m) with VC, LiBOB and PRS as additives. The quantity of electrolyte is calculated in accordance with the porosity and dimensions of the positive and negative electrode, and the porous separator. Finally, the packaged full cell is sealed by a sealing machine.

b) Full Cell Cycling

The full cell is cycled at both 25° C. (=RT) and 45° C. (=HT) using Toscat-3100 computer-controlled galvanostatic cycling stations (Toyo) between 3.0V and 4.35V or 4.4V under CC/CV (constant current/constant voltage) mode at 1 C rate (corresponding to the current which discharges a charged cell within 1 hr). In the cycling stability test there is measured up to which cycle No. at least 80% of the initial capacity remains.

c) Full Cell Bulging Test

The fully charged cells are stored in an oven at 90° C. for 4 hours. The reaction between active material and electrolyte generates gas in a full cell, resulting in the increase of battery thickness (bulging). The thickness of the full cells is measured before and after storing in the oven. The reported value is the ratio of increased full cell thickness, expressed in % increase versus the initial thickness.

d) XPS Measurement

The measurements are carried out in a Quantera SXM™ from ULVAC-PHI (Q2). The measurements are performed using monochromatic Al—Kα-radiation and a spot size of 100 μm scanning across an area of 1200×500 μm (High Sensitivity Mode). The measurement angle θ is 45°; at this setting the information depth is approximately 7 nm. By means of wide-scan measurements the elements present at the surface are identified. Accurate narrow-scans are performed to determine the precise surface composition. Concentration—depth profiles are determined by alternating measurements and ion bombardment (Argon ions, Vi=4 kV, raster 3×3 mm, sputter rate in $SiO_2$: 6.0 nm/minute). The XPS gives a measurement only from the surface up to approx. 200 nm inside the particles. Known techniques such as ICP give the average composition of the powder. It is known that ICP gives a more accurate average measurement than XPS, but XPS is especially adequate to investigate the differences in composition at different depths in a surface layer.

Example 1: A powder according to the invention is manufactured on a pilot line of Umicore (Korea), by the following steps:

(a) Blending of lithium and nickel-manganese-cobalt precursor: lithium carbonate and a mixed Ni—Mn—Co oxy-hydroxide are homogeneously blended in a vertical single-shaft mixer by a dry powder mixing process.

The blend ratio is targeted to obtain $Li_{1.01}$ $(Ni_{0.4}$ $(N_{1/2}$ $Mn_{1/2})_{0.4}$ $Co_{0.2})_{0.99}$ $O_2$, which can be easily verified by an analysis technique such as ICP.

(b) Synthesizing in an oxidizing atmosphere: the powder mixture from step (a) is sintered in a tunnel furnace in an oxidizing atmosphere. The sintering temperature is >900° C. and the dwell time is ~10 hrs. Dry air is used as an oxidizing gas.

(c) Milling: after sintering, the sample is milled in a grinding machine to a particle size distribution with D50=11-12 μm. The span is 1.20. Span is defined as (D90−D10)/D50 where DXX are the corresponding XX values of the volume distribution of the particle size analysis.

(d) one step Al doping and alumina coating: 1 kg of the $Li_{1.01}$ $(Ni_{0.4}$ $(Ni_{1/2}$ $Mn_{1/2})_{0.4}$ $Co_{0.2})_{0.99}$ $O_2$ powder from step (c) is filled into a mixer (in the example a 2 L Henschel type Mixer) and 2 g of fumed alumina ($Al_2O_3$) nano-powder is added as well. After homogeneously mixing (usually 30 mins at 1000 rpm), the mixture is sintered in a box furnace in an oxidizing atmosphere. The sintering temperature is 700° C. and the dwell time is ~5 hrs. Dry air is used as an oxidizing gas. It can be verified that after the sintering step at this temperature Al is doped in the lithium metal oxide (core), and XPS measurements show a gradient that is established at the surface with increasing Al content, whereas the surface itself is covered with a very thin $Al_2O_3$ coating. After this step the material could be represented by the overall formula $Li_{1.01}$ $((Ni_{0.4}$ $(N_{1/2}$ $Mn_{1/2})_{0.4}$ $Co_{0.2})_{0.996}$ $Al_{0.004})_{0.99}$ $O_2$.

(e) Alumina and LiF coating: 1 kg of powder obtained from process (d) is filled into a mixer (in the example a 2 L Henschel type Mixer), 2 g of fumed alumina ($Al_2O_3$) nano-powder and 3 g polyvinylidene fluoride (PVDF) powder is added as well. After homogeneously mixing (usually 30 mins at 1000 rpm), the mixture is sintered in a box furnace in an oxidizing atmosphere. The sintering temperature is 375° C. and the dwell time is ~5 hrs. Dry air is used as an oxidizing gas. The surface layer established in step (d) is not creating a barrier for the PVDF to react with Li present at the inner surface, and to form LiF. It can be verified that after the second sintering step the surface layer is a mixture of elements of the core, LiF and $Al_2O_3$. The final Al content is 0.8 mol % (as can be determined by ICP).

Example 2: A powder according to the invention is manufactured on a pilot line of Umicore (Korea), by the following steps:

steps (a), (b) and (c) are identical to Example 1, followed by:

(d) one step Al doping and alumina coating: 1 kg of the $Li_{1.01}$ $(Ni_{0.4}$ $(N_{1/2}$ $Mn_{1/2})_{0.4}$ $Co_{0.2})_{0.99}$ $O_2$ powder from step (c) is filled into a mixer (in the example a 2 L Henschel type Mixer) and 2 g of fumed alumina ($Al_2O_3$) nano-powder is added as well. After homogeneously mixing (usually 30 mins at 1000 rpm), the mixture is sintered in a box furnace in an oxidizing atmosphere. The sintering temperature is 500° C. and the dwell time is ~10 hrs. Dry air is used as an oxidizing gas. It can be verified that after the sintering step at this temperature Al is doped in the lithium metal oxide (core), and XPS measurements show a gradient that is established at the surface with increasing Al content, whereas the surface itself is covered with a very thin $Al_2O_3$ coating. After this step the material could be represented by the overall formula $Li_{1.01}$ $((Ni_{0.4}$ $(N_{1/2}$ $Mn_{1/2})_{0.4}$ $Co_{0.2})_{0.996}$ $Al_{0.004})_{0.99}$ $O_2$.

step (e) Alumina and LiF coating: is identical as in Example 1

Example 3: A powder according to the invention is manufactured on a pilot line of Umicore (Korea), by the following steps:

steps (a), (b) and (c) are identical to Example 1, followed by:

(d) one step Al doping and alumina coating: 1 kg of the $Li_{1.01}$ $(Ni_{0.4}$ $(Ni_{1/2}$ $Mn_{1/2})_{0.4}$ $Co_{0.2})_{0.99}$ $O_2$ powder from step (c) is filled into a mixer (in the example a 2 L Henschel type Mixer) and 1 g of fumed alumina ($Al_2O_3$) nano-powder is added as well. After homogeneously mixing (usually 30 mins at 1000 rpm), the mixture is sintered in a box furnace in an oxidizing atmosphere. The sintering temperature is 500° C. and the dwell time is ~10 hrs. Dry air is used as an oxidizing gas. It can be verified that after the sintering step at this temperature Al is doped in the lithium metal oxide (core), and XPS measurements show a gradient that is established at the surface with increasing Al content, whereas the surface itself is covered with a very thin $Al_2O_3$ coating. After this step the material could be represented by the overall formula $Li_{1.01}$ $((Ni_{0.4}$ $(N_{1/2}$ $Mn_{1/2})_{0.4}$ $Co_{0.2})_{0.998}$ $Al_{0.002})_{0.99}$ $O_2$.

(e) Alumina and LiF coating: 1 kg of powder obtained from process (d) is filled into a mixer (in the example a 2 L Henschel type Mixer), 4 g of fumed alumina ($Al_2O_3$) nano-powder and 3 g polyvinylidene fluoride (PVDF) powder is added as well. After homogeneously mixing (usually 30 mins at 1000 rpm), the mixture is sintered in a box furnace in an oxidizing atmosphere. The sintering temperature is 400° C. and the dwell time is ~5 hrs. Dry air is used as an oxidizing gas. The surface layer established in step (d) is not creating a barrier for the PVDF to react with Li present at the inner surface, and to form LiF. It can be verified that after the second sintering step the surface layer is a mixture of elements of the core, LiF and $Al_2O_3$. The final Al content is 1.2 mol % (as can be determined by ICP).

Example 4: A powder according to the invention is manufactured on a pilot line of Umicore (Korea), by the following steps:

(a) Blending of lithium, calcium and nickel-manganese-cobalt precursor: lithium carbonate, CaO and a mixed Ni—Mn—Co oxy-hydroxide are homogeneously blended in a vertical single-shaft mixer by a dry powder mixing process. The blend ratio is targeted to obtain $Li_{1.01}$ $((Ni_{0.4}$ $(N_{1/2}$ $Mn_{1/2})_{0.4}$ $Co_{0.2})_{0.995}$ $Ca_{0.005})_{0.99}$ $O_2$, which can be easily verified by an analysis technique such as ICP.

steps (b) and (c) are identical to Example 1, and are followed by:

(d) one step Al doping and alumina coating: 1 kg of the powder from step (c) is filled into a mixer (in the example a 2 L Henschel type Mixer) and 2 g of fumed alumina ($Al_2O_3$) nano-powder is added as well. After homogeneously mixing (usually 30 mins at 1000 rpm), the mixture is sintered in a box furnace in an oxidizing atmosphere. The sintering temperature is 500° C. and the dwell time is ~10 hrs. Dry air is used as an oxidizing gas. It can be verified that after the sintering step at this temperature Al is doped in the lithium metal oxide (core), and XPS measurements show a gradient that is established at the surface with increasing Al content, whereas the surface itself is covered with a very thin $Al_2O_3$ coating. After this step the material could be represented by the formula $Li_{1.01}$ (($Ni_{0.4}$ ($N_{1/2}$ $Mn_{1/2})_{0.4}$ $Co_{0.2})_{0.991}$ $Ca_{0.005}$ $Al_{0.004})_{0.99}$ $O_2$.

(e) Alumina and LiF coating: 1 kg of powder obtained from process (d) is filled into a mixer (in the example a 2 L Henschel type Mixer), 2 g of fumed alumina ($Al_2O_3$) nano-powder and 3 g polyvinylidene fluoride (PVDF) powder is added as well. After homogeneously mixing (usually 30 mins at 1000 rpm), the mixture is sintered in a box furnace in an oxidizing atmosphere. The sintering temperature is 400° C. and the dwell time is ~5 hrs. Dry air is used as an oxidizing gas. The surface layer established in step (d) is not creating a barrier for the PVDF to react with Fi present at the inner surface, and to form LiF. It can be verified that after the second sintering step the surface layer is a mixture of elements of the core, LiF and $Al_2O_3$. The final Al content is 0.8 mol % (as can be determined by ICP).

Counterexample 1: A positive electrode material $Li_{1.01}$ (($Ni_{0.4}$ ($N_{1/2}$ $Mn_{1/2})_{0.4}$ $Co_{0.2})_{0.996}$ $Al_{0.004})_{0.99}$ $O_2$ is manufactured through the process steps (a), (b), (c) and (d), without additional alumina and LiF coating (process (e)).

Counterexample 2: A positive electrode material is manufactured through the process steps (a), (b), (c) and (e), where Al and the polymer were only added in the process of step (e) resulting in a final Al content of 0.4 mol % (determined by ICP). The powder after step (b) has the formula $Li_{1.01}$ ($Ni_{0.4}$ ($N_{1/2}$ $Mn_{1/2})_{0.4}$ $Co_{02})_{0.99}$ $O_2$. There is no Al doping/alumina coating that is typical for process step (d). The obtained powder thus has no Al doped in the core.

Counterexample 3: A coated positive electrode material that can be represented by the formula $Li_{1.01}$ (($Ni_{0.4}$ ($Ni_{1/2}$ $Mn_{1/2})_{0.4}$ $Co_{0.2})_{0.996}$ $Al_{0.004})_{0.99}$ $O_2$ is manufactured through the process (a), (b), (c) and (d), without alumina and LiF coating (process (e)). However, the sintering temp in step (d) is 375° C., resulting in a coating with only alumina instead of a doping with Al, as described in Wu et al., "High Capacity, Surface-Modified Layered Li[$Li_{(1-x)/3}Mn_{(2-x)/3}Ni_{x/3}Co_{x/3}$]$O_2$ Cathodes with Low Irreversible Capacity Loss," Electrochemical and Solid State Letters, 9 (5) A221-A224 (2006). The obtained powder thus has no Al doped in the core.

Counterexample 4: A positive electrode material that could be represented by the formula $Li_{1.01}$ (($Ni_{0.4}$ ($Ni_{1/2}$ $Mn_{1/2})_{0.4}$ $Co_{0.2})_{0.996}$ $Al_{0.004})_{0.99}$ $O_{1.991}F_{0.009}$ is manufactured through the process (a), (b), (c) and (e). However, the F source is $AlF_3$, and as is known from US2011/111298 the $AlF_3$ heated at the same temperatures as in the present invention (in step (e)) does not react with the Li at the inner interface of the surface layer. The obtained powder also has no Al doped in the core.

Counterexample 5: A positive electrode material "NMC622" $Li_{1.01}$ (($Ni_{0.4}$ ($Ni_{1/2}$ $Mn_{1/2})_{0.4}$ $Co_{0.2})_{0.99}$ $O_2$ is manufactured through the process (a), (b), (c) without any further treatment.

Counterexample 6: A commercial positive electrode material "NMC532" $Li_{1.01}$ ($Ni_{0.5}$ $Mn_{0.3}$ $Co_{0.2})_{0.99}$ $O_2$ is supplied.

Counterexample 7: A commercial positive electrode material $LiCoO_2$ is supplied.

Discussion

Figure 2A:
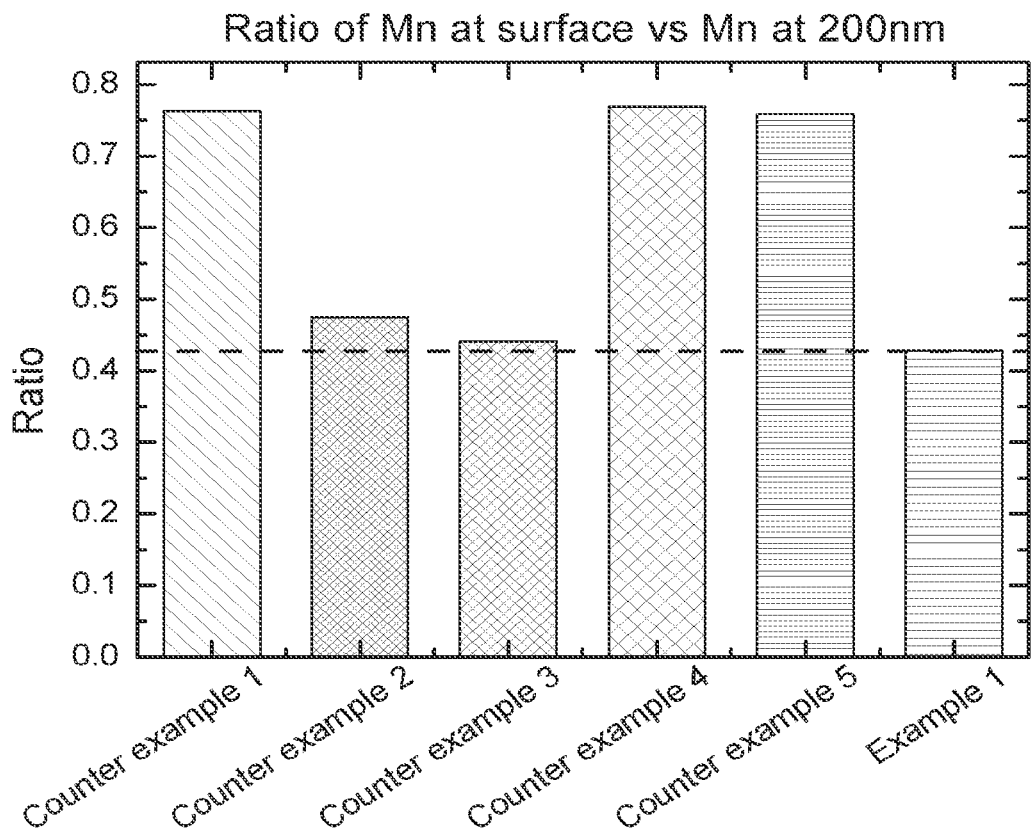
FIG. 2A: Ratio of Mn atomic concentration at the surface (XPS depth=0) vs. Mn atomic concentration at XPS depth=200 nm.
Figure 2B:
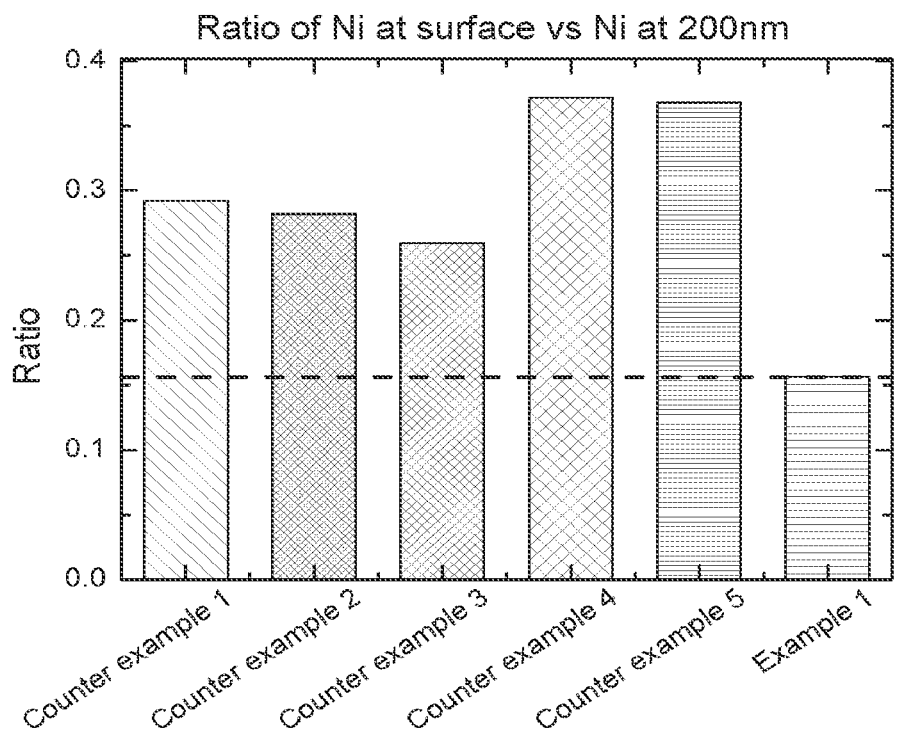
FIG. 2B: Ratio of Ni atomic concentration at the surface (XPS depth=0) vs. Ni atomic concentration at XPS depth=200 nm.
Figure 2C:
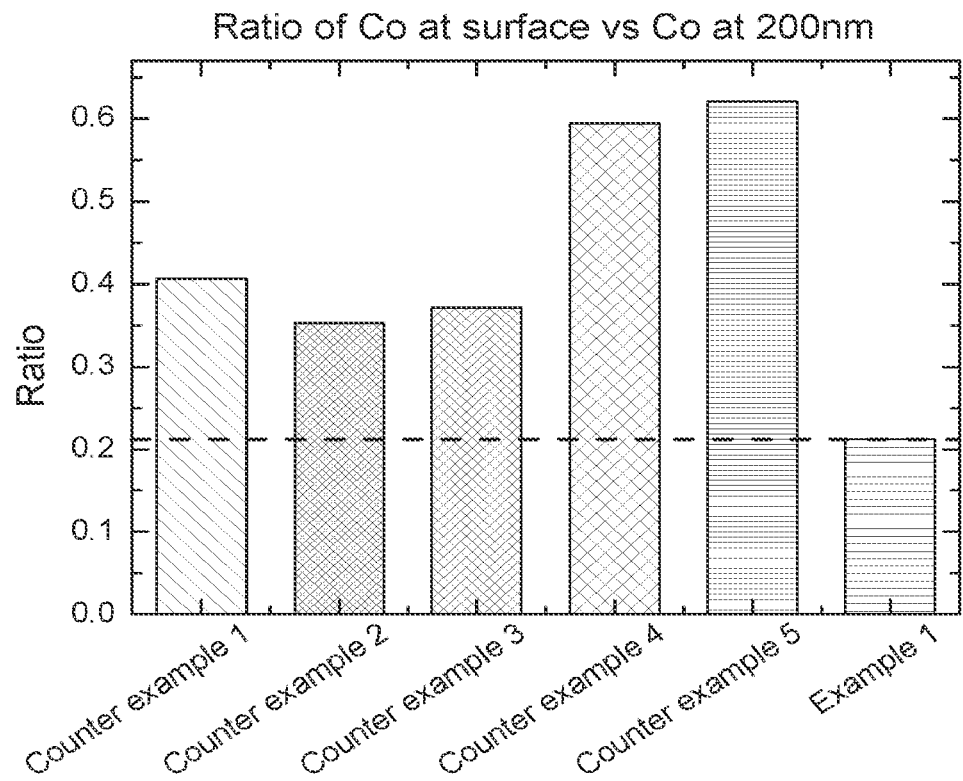
FIG. 2C: Ratio of Co atomic concentration at the surface (XPS depth=0) vs. Co atomic concentration at XPS depth=200 nm.
Figure 3:
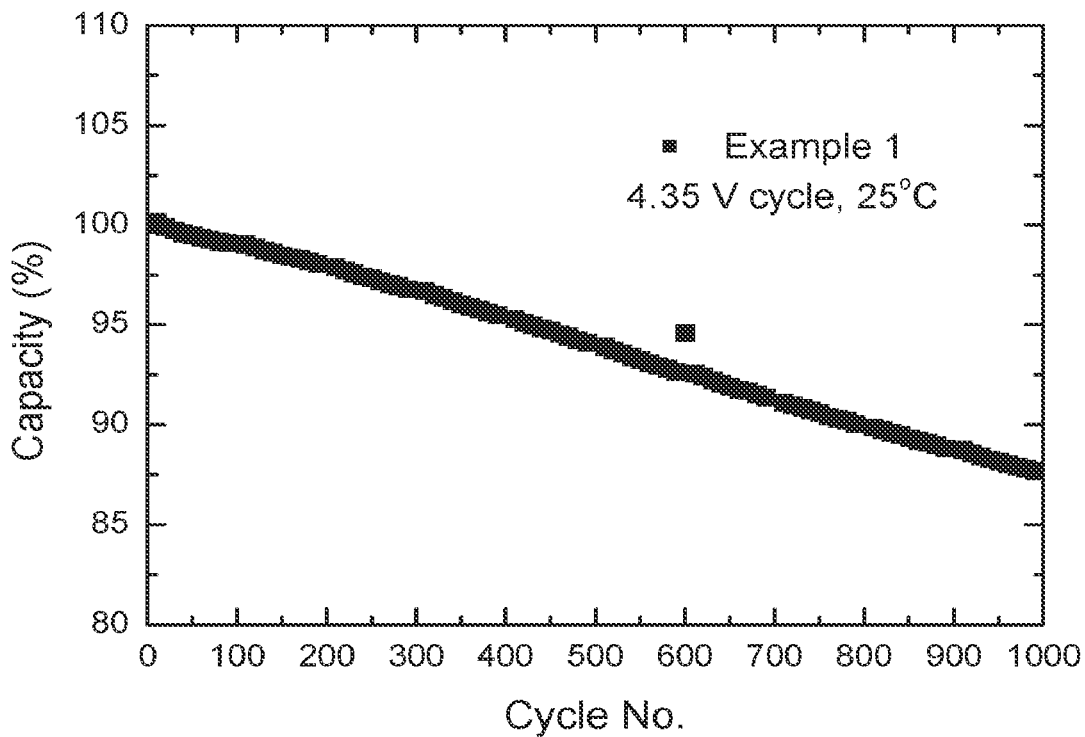
FIG. 3: Full cell cycle stability of Example 1 between 3.0~4.35V at 25° C.
Figure 4:
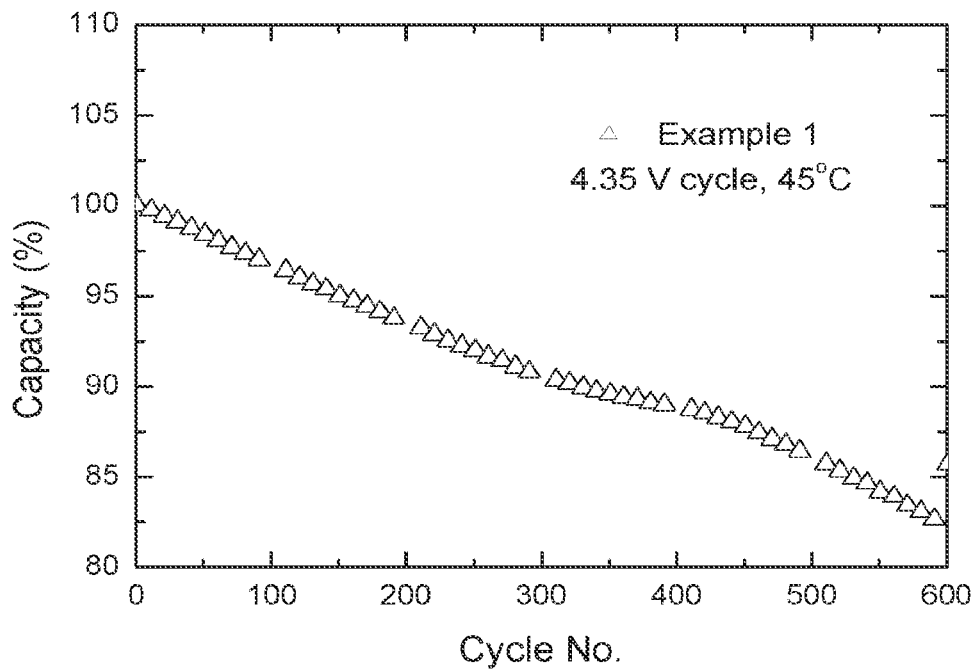
FIG. 4: Full cell cycle stability of Example 1 between 3.0~4.35V at 45° C.
Figure 5:
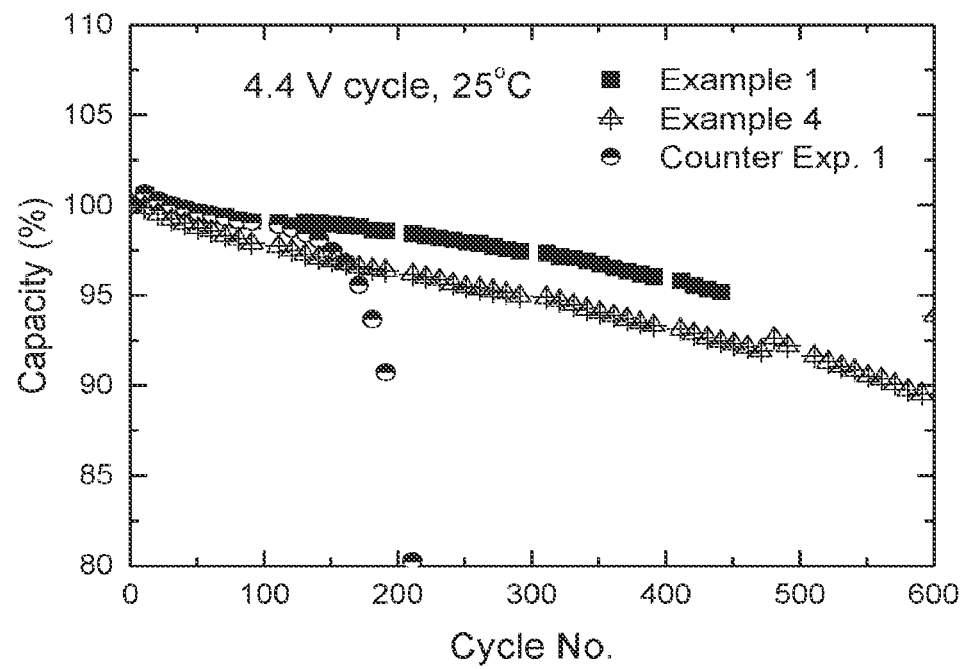
FIG. 5: Comparison of full cell cycle stability of Example 1 and Example 4 vs. Counterexample 1 between 3.0~4.4V at 25° C.
Figure 6:
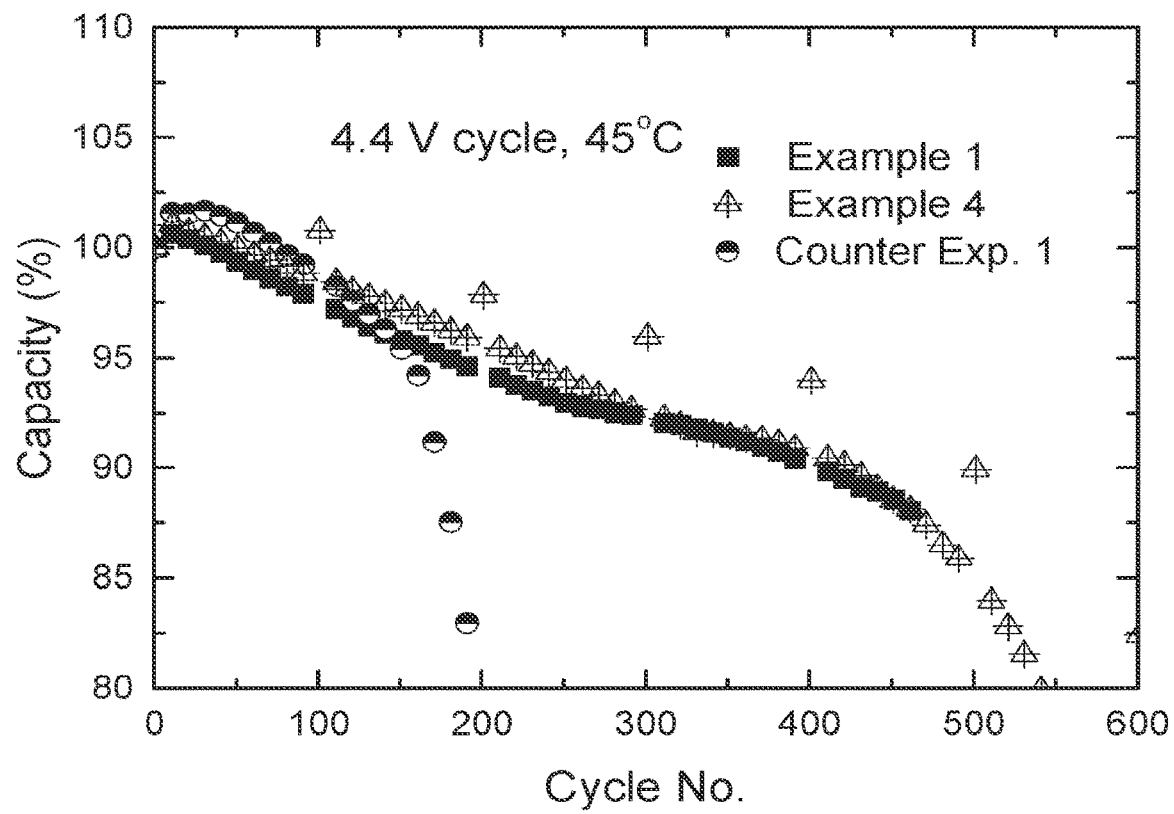
FIG. 6: Comparison of full cell cycle stability of Example 1 and Example 4 vs. Counterexample 1 between 3.0~4.4V at 45° C.
Figure 7:
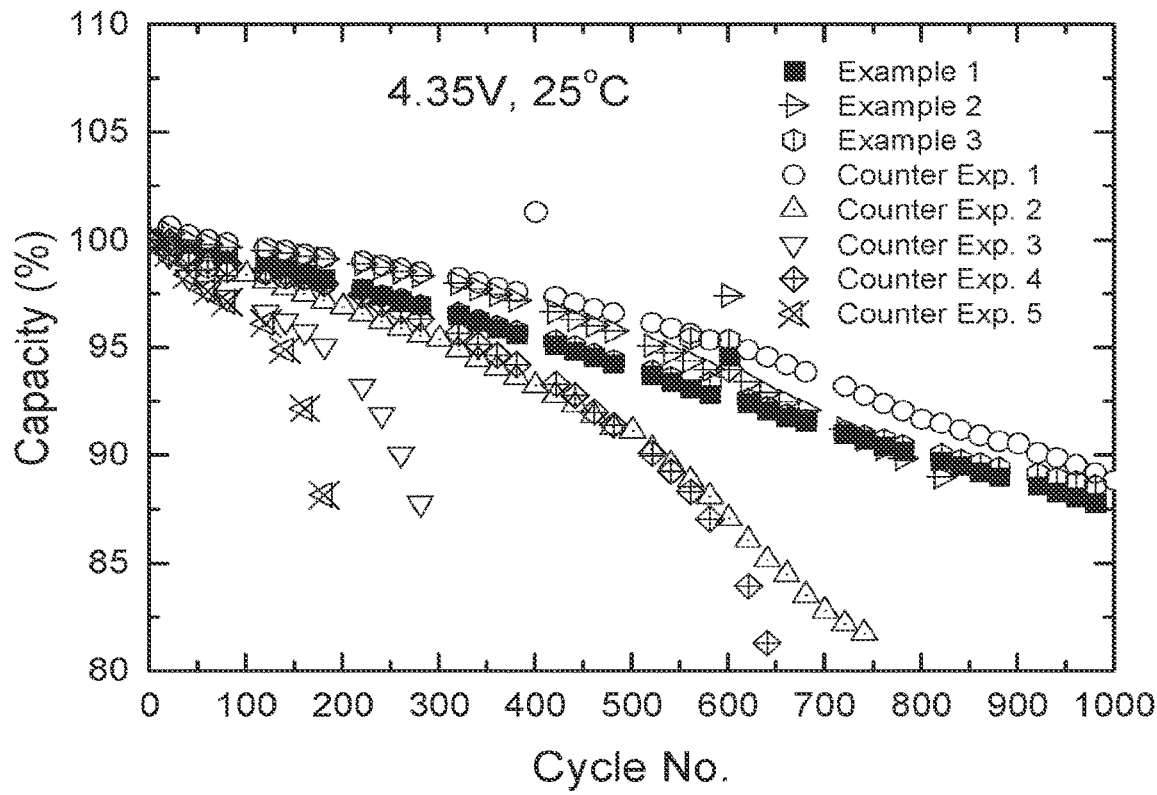
FIG. 7: Comparison of full cell cycle stability of Examples 1~3 vs. Counterexamples between 3.0~4.35V at 25° C.
Figure 8:
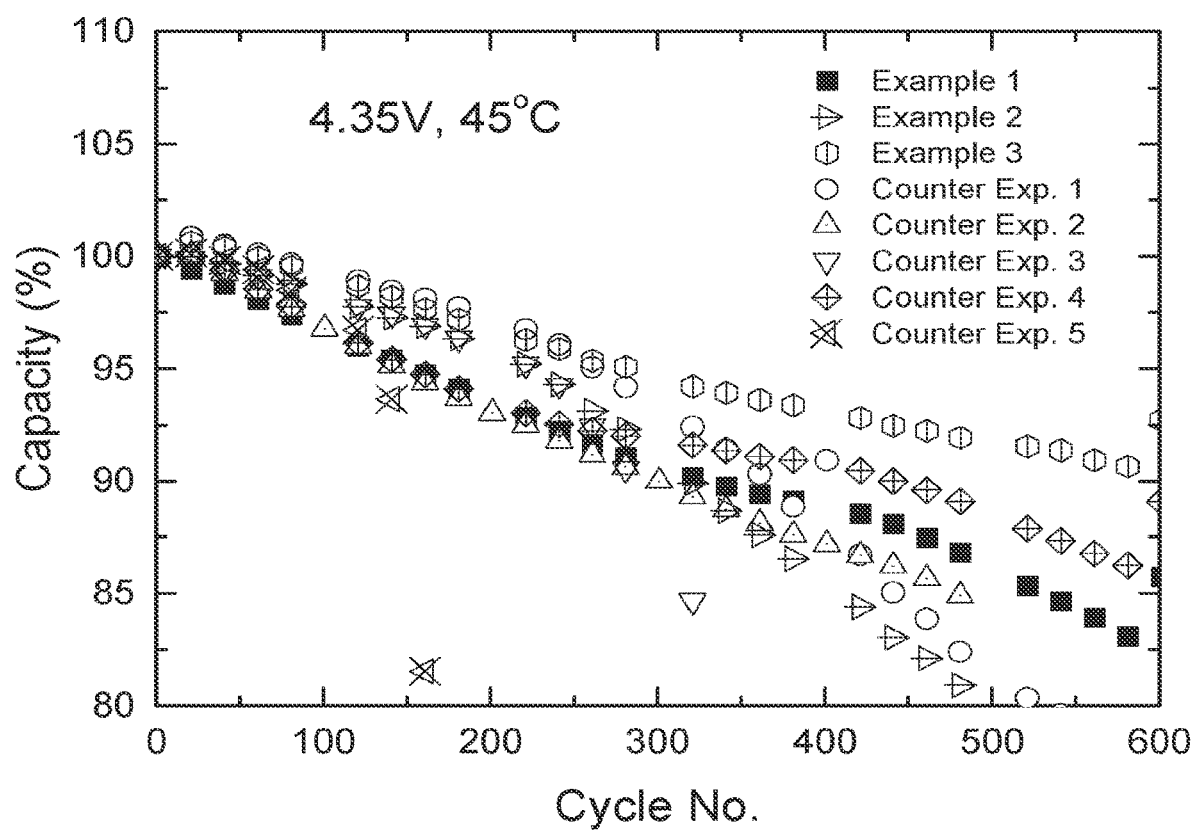
FIG. 8: Comparison of full cell cycle stability of Examples 1~3 vs. Counterexamples between 3.0~4.35V at 45° C.

FIG. 1 and FIGS. 2A-2C show the properties of the surface layer of Example 1. The gradients of Al and F in the surface layer and the outer portion of the core as measured by XPS are shown in FIG. 1. There is also a clear effect of suppression of the Mn, Ni and Co concentrations at the outer interface of the surface, as shown in FIGS. 2A-2C (resp. showing the ratio of resp. Mn, Ni and Co (XPS measurements) at the particle surface versus the content at 200 nm depth, which corresponds to the outer portion of the core). Such unique surface properties are related to an exceptional electrochemical performance of the invented cathode materials. The full cell cycle stability of Example 1 between 3.0–4.35V at 25° C. and 45° C. is shown in FIGS. 3 and 4 (expressed in % of capacity vs. first cycle=100%). The comparison of the full cell cycle stability of Example 1 and Example 4 vs. Counterexample 1 between 3.0–4.4V at 25° C. and 45° C. is shown in FIGS. 5 and 6, where the full cell of Example 1 and Example 4 in each have a higher capacity after 450 cycles. FIG. 7 gives a comparison of the full cell cycle stability of Example 1~3 vs. Counterexamples 1~5 between 3.0–4.35V at 25° C., in FIG. 8 the same is shown for cycling between 3.0–4.35V at 45° C. FIGS. 7 and 8 show that although the cycling stability of Examples 1–3 and Counterexample 1 are comparable at room temperature, at high temperatures (45° C. being characteristic for automotive applications) Examples 1~3 are superior, whereas the inverse is shown for the comparison between Examples 1~3 and Counterexample 4. Only Examples 1~3 are superior in cycling stability at both room and high temperature. In FIG. 7 the top line is for Counterex. 1, and just below is Example 2, and then following are Example 3 and Example 1. In FIG. 8 the top line at 600 cycles is for Example 3, and just below is Counterexample 4, and then following is Example 1. In both figures the other lines can be distinguished using the data of Table 1. Example 4 is not tested at 4.35 V but tested at a more extreme condition, which is 4.4V.

Table 1 summarizes the cycle stability of full cells of the different Examples. When a full cell charged to 4.35V, which is a tough condition for ordinary polymer cells using an NMC cathode, Example 1 surprisingly shows a good cycling stability at both room and elevated temperatures. Even when charged to 4.4V, Example 1 shows a superior cycle stability. The same performance could be achieved in Example 4. The 4.4V cycle test is only applied for Counterexample 1, due to its comparable performance with Example 1 at 4.35 V cycling. However, the full cell of Counterexample 1 dies just after 200 cycles.

TABLE 1

Comparison of cycle stability at different cycle conditions

|  | RT cycle (4.35 V) | HT cycle (4.35 V) | RT cycle (4.4 V) | HT cycle (4.4 V) |
| --- | --- | --- | --- | --- |
| Example 1 | >1000 cy # | >600 cy # | >500 cy # | >500 cy # |
| Example 2 | >1000 cy # | >600 cy # | NT | NT |
| Example 3 | >1000 cy # | >500 cy # | NT | NT |
| Example 4 | NT | NT | >500 cy # | >500 cy # |
| Counterexample 1 | >1000 cy # | 500 cy # | 200 cy # | 200 cy # |
| Counterexample 2 | 700 cy # | 500 cy # | NT | NT |
| Counterexample 3 | 300 cy # | 300 cy # | NT | NT |
| Counterexample 4 | 600 cy # | >600 cy # | NT | NT |
| Counterexample 5 | 200 cy # | 150 cy # | NT | NT |

Figure 9:
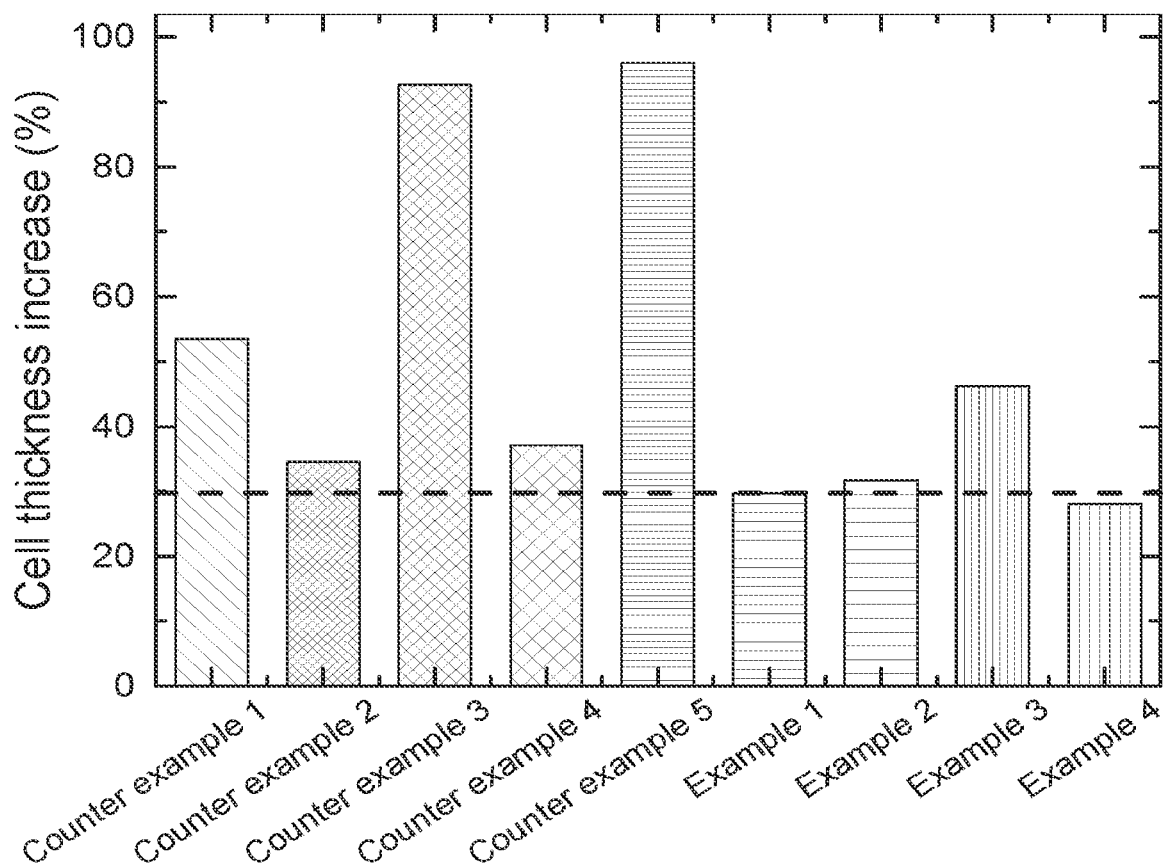
FIG. 9: Full cell thickness increase ratio of Examples 1~4 vs. Counterexamples after bulging test.

(Cycle No. refers to the cycle with 80% capacity remaining)
NT = not tested;
cy # = number of cycles FIG. 9 shows the full cell thickness increase of Examples 1~4 compared to the different Counterexamples after a bulging test. Examples 1~4 generally show a lower thickness increase compared to the other materials. As was discussed in the background section, the issue of "bulging" of high Ni NMC materials at high voltage is related to bad cycling life and safety issues. The bulging problem can be greatly improved by the novel surface modification provided in this invention.

Figure 10:
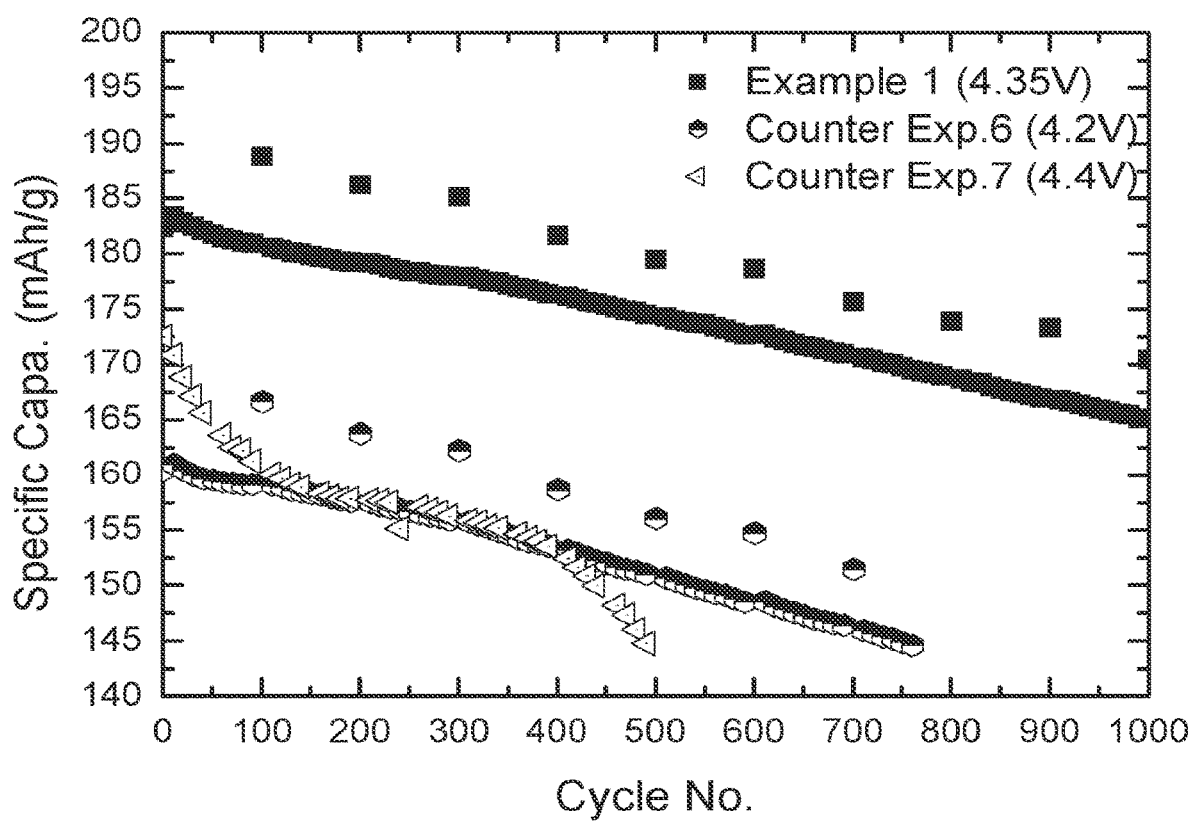
FIG. 10: Comparison of full cell cycle stability of Example 1 vs. Counterexample 6 and 7

FIG. 10 shows a comparison of the specific capacity of Example 1 charged to 4.35 V with commercial NMC532 charged to 4.2V and commercial $LiCoO_2$ charged to 4.4V. Example 1 can be written as coated NMC622. It is clear that Example 1 shows a gain of 13% in specific capacity compared to NMC532 and 5% improvement compared to $LiCoO_2$. The cycling stability of the powder according to the invention is equal or even better than NMC532 and especially $LiCoO_2$. Such material is an ideal cathode material for achieving a higher energy density compared to current commercial materials, in the desired high end portable and automotive applications.

The invention claimed is:

1. A lithium metal oxide powder for a cathode material in a rechargeable battery, comprising a core and a surface layer, the surface layer being delimited by an outer and an inner interface, the inner interface being in contact with the core, the cathode material having a layered crystal structure comprising the elements Li, M and oxygen, wherein M has the formula $M=(Ni_z\ (Ni_{1/2}\ Mn_{1/2})_y\ Co_x)_{1-k}\ A_k$, with $0.15 \leq x < 0.20$, $0.40 \leq z \leq 0.55$, $x+y+z=1$ and $0 < k \leq 0.1$, wherein x, y, z, and k are measured by ICP; wherein the Li content is stoichiometrically controlled with a molar ratio $1.00 \leq Li:M \leq 1.10$; wherein A is at least one dopant and comprises Al and one or more elements selected from the group consisting of Ca, Zr, W, Cr, and V, wherein the core at the inner interface has an Al content of 0.3-3 mol %; wherein the surface layer comprises an intimate mixture of Ni, Co, Mn, LiF and $Al_2O_3$ determined by XPS; and wherein the surface layer has a Mn content that decreases from the Mn content at the inner interface, to less than 50% of the Mn content at the outer interface, wherein Mn contents at the inner and outer interfaces are measured by XPS depth profile.

2. The lithium metal oxide powder of claim 1, wherein the surface layer has a Ni content that decreases from the Ni content of the core at the inner interface, to less than 25% of the Ni content of the core at the outer interface, as determined by XPS.

3. The lithium metal oxide powder of claim 1, wherein the surface layer has a Co content that decreases from the Co content of the core at the inner interface, to less than 35% of the Co content of the core at the outer interface, as determined by XPS.

4. The lithium metal oxide powder of claim 1, wherein the surface layer further comprises one or more compounds selected from the group consisting of CaO, $TiO_2$, MgO, $WO_3$, $ZrO_2$, $Cr_2O_3$ and $V_2O_5$.

5. The lithium metal oxide powder of claim 1, wherein the surface layer consists of a mixture of Ni, Co, Mn and LiF, and either nanometric crystalline $Al_2O_3$ or nanometric crystalline $Al_2O_3$ and sub-micrometric CaO.

6. The lithium metal oxide powder of claim 1, wherein $0.005 \leq k \leq 0.02$ and A=Al and Ca.

7. The lithium metal oxide powder of claim 1, wherein $k=0.01\pm0.005$, $x=0.18 \leq x \leq 0.2$, $y=0.40\pm0.05$, $z=0.40 \leq z \leq 0.45$, $1.00 \leq Li:M \leq 1.10$ and A=Al and Ca.

8. The lithium metal oxide powder of claim 1, wherein the thickness of the surface layer is more than 50 nm and less than 400 nm.

9. The lithium metal oxide powder of claim 1, wherein the F content of the core=0 mol %.

10. A method for making the lithium metal oxide powder of claim 1, comprising:
providing a first mixture comprising a lithium M'-oxide powder, with $M'=Ni_z\ (Ni_{1/2}\ Mn_{1/2})_y\ Co_x$, $0.15 \leq x \leq 0.20$, $0.40 \leq z \leq 0.55$ and $x+y+z=1$, and a first source of A comprising Al,
heating the first mixture to a first sintering temperature of at least 500° C.,
sintering the first mixture at the first sintering temperature for a first period of time,
cooling the first sintered mixture,
adding a fluorine-containing polymer and a second source of A comprising Al to the first sintered mixture, thereby obtaining a second mixture,
heating the second mixture to a second sintering temperature between 250° and 500° C.,
sintering the second mixture at the second sintering temperature for a second period of time, thereby obtaining the lithium metal oxide powder, and cooling the powder.

11. The method according to claim 10, wherein one or both of the first and the second source of A is $Al_2O_3$.

12. The method according to claim 11, wherein one or both of the first and the second source of A further comprises one or more compounds selected from the group consisting of CaO, $TiO_2$, MgO, $WO_3$, $ZrO_2$, $Cr_2O_3$ and $V_2O_5$.

13. The method according to claim 10, wherein the first source of A and/or the second source of A comprises a nanometric alumina powder having a D50<100 nm and a BET$\geq$50 $m^2$/g.

14. The method according to claim 10, wherein the amount of fluorine-containing polymer in the second mixture is between 0.1 and 2 wt %.

15. The method according to claim 10, wherein the fluorine-containing polymer comprises a PVDF homopolymer, a PVDF copolymer, a PVDF-hexafluoropropylene (HFP) polymer or a PTFE polymer.

16. An electrochemical cell comprising the lithium metal oxide powder of claim 1.

* * * * *